(12) United States Patent
Nakanishi et al.

(10) Patent No.: US 7,754,366 B2
(45) Date of Patent: Jul. 13, 2010

(54) TUBULAR FUEL CELL MODULE AND MANUFACTURING METHOD THEREOF

(75) Inventors: Haruyuki Nakanishi, Susono (JP);
Shigeaki Murata, Numazu (JP);
Masahiro Imanishi, Susono (JP);
Yoshihisa Tamura, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 56 days.

(21) Appl. No.: 12/084,263

(22) PCT Filed: Nov. 9, 2006

(86) PCT No.: PCT/IB2006/003158

§ 371 (c)(1),
(2), (4) Date: Apr. 29, 2008

(87) PCT Pub. No.: WO2007/054793

PCT Pub. Date: May 18, 2007

(65) Prior Publication Data

US 2009/0162714 A1    Jun. 25, 2009

(30) Foreign Application Priority Data

Nov. 10, 2005 (JP) ............................. 2005-326727
Nov. 10, 2005 (JP) ............................. 2005-326729

(51) Int. Cl.
*H01M 8/10* (2006.01)
*H01M 8/12* (2006.01)
(52) U.S. Cl. .......................................... 429/31; 429/26
(58) Field of Classification Search .................. 429/34, 429/31, 35, 30, 33, 26
See application file for complete search history.

(56) References Cited

U.S. PATENT DOCUMENTS

| 6,444,339 B1 | 9/2002 | Eshraghi |
| 2003/0035990 A1 | 2/2003 | Washima |
| 2003/0134169 A1* | 7/2003 | Sarkar et al. .................. 429/31 |
| 2005/0214613 A1 | 9/2005 | Sarkar et al. |

FOREIGN PATENT DOCUMENTS

| EP | 0 562 724 A2 | 9/1993 |
| JP | 63-133464 A | 6/1988 |
| JP | 04-505417 A | 2/2004 |
| WO | WO 02/09212 A1 | 1/2002 |
| WO | WO 2007/026952 A1 | 3/2007 |
| WO | WO 2007/026955 A2 | 3/2007 |

OTHER PUBLICATIONS

English translation of JP 63133464, Tanabe, Seiichi, Jun. 1988.*

* cited by examiner

*Primary Examiner*—Jonathan Crepeau
*Assistant Examiner*—Kenneth Douyette
(74) *Attorney, Agent, or Firm*—Kenyon & Kenyon LLP

(57) ABSTRACT

A tubular fuel cell module is provided with a tubular cell of a tubular fuel cell, and a heat transfer pipe through which a heating/cooling medium flows to selectively heat and cool the tubular fuel cell. The heat transfer pipe includes a first straight portion, a second straight portion, and a bent portion that connects the first straight portion with the second straight portion. At least a portion of the tubular cell is arranged on at least one of the first straight portion and the second straight portion. As a result, the reliability of a seal of the tubular fuel cell module is improved.

11 Claims, 10 Drawing Sheets

TUBULAR FUEL CELL MODULE AND MANUFACTURING METHOD THEREOF

This is a 371 national phase application of PCT/IB2006/003158 filed 9 Nov. 2006, claiming priority to Japanese Patent Applications No. 2005-326727 & No. 2005-326729 both filed 10 Nov. 2005, the contents of which are incorporated herein by reference.

BACKGROUND OF THE INVENTION

1. Field of the Invention

The invention relates to a tubular fuel cell module and a manufacturing method thereof. More particularly, the invention relates to a tubular fuel cell module having improved seal reliability and a manufacturing method of that tubular fuel cell module.

2. Description of the Related Art

In recent years much research has been done with tubular fuel cells (hereinafter also referred to as "tubular PEFC") with an aim to improve output density per unit volume to at least a certain level. The unit cell of a tubular PEFC (hereinafter also referred to as "tubular cell") typically includes a Membrane Electrode Assembly (MEA) which has a hollow electrolyte layer and a catalyst layer arranged on both sides (i.e., the inside and the outside) of that hollow electrolyte layer. Electric energy which is generated through an electrochemical reaction induced by supplying a gas containing hydrogen to the inside of the MEA and a gas containing oxygen to the outside of the MEA is then extracted from the unit cell via collectors arranged on the inside and outside of the MEA. That is, in a tubular PEFC, generated electric energy is extracted by supplying one reaction gas (such as a gas containing hydrogen, for example) to the inside of the MEA provided in each unit cell and supplying another reaction gas (such as a gas containing oxygen, for example) to the outside of the MEA provided in each unit cell, which means that the same reaction gas can be supplied to the outside surfaces of two adjacent unit cells. Therefore, a tubular PEFC does not require separators which serve to separate the gases and that are required by a conventional flat plate fuel cell, which enables the unit cell to effectively be made smaller.

Published Japanese National Phase Application No. 2004-505417 of PCT application, for example, describes technology related to such a tubular PEFC. More specifically, the described technology relates to a fuel cell in which all of the components of a microcell are fabricated in a single fiber assembly. The described technology is able to generate high density energy output and thus minimize the volume of an electrochemical cell apparatus (i.e., a tubular fuel cell).

The electrolyte membrane of the tubular cell expresses a proton conducting ability within a predetermined temperature range (such as within a range around 80 degrees Celsius, for example). Therefore, when the tubular PEFC is operating, the temperature of the electrolyte membrane must be maintained within that temperature range. Accordingly, with a tubular PEFC module having a tubular cell, in order to keep the temperature of that tubular cell or the electrolyte membrane that forms a part of the tubular cell within the appropriate range, a heat transfer pipe is arranged on at least one of the inside and the outside of the tubular cell and the temperature of the tubular cell is regulated by warming or cooling the tubular cell using a heating/cooling medium that flows through the heat transfer pipe.

In this way, in a tubular PEFC (module), a heating/cooling medium is also used in addition to a gas containing hydrogen and a gas containing oxygen so a seal portion which separates the gases from the heating/cooling medium must be provided at, for example, an end portion of the tubular cell or the MEA which constitutes a portion of the tubular cell. In a related tubular PEFC module such as that described in Published Japanese National Phase Application No. 2004-505417 of PCT application, for example, one seal portion is provided for separating the two kinds of reaction gases, another seal portion is provided for separating the reaction gases from the heating/cooling medium, and yet another seal portion is provided for separating the heating/cooling medium from ambient air.

However, when the tubular PEFC having the structure described in Published Japanese National Phase Application No. 2004-505417 of PCT application is operated and as a result the temperature of the constituent elements represented by the tubular cell and the heat transfer pipe and the like rises, the tubular cell and the heat transfer pipe expand. As a result, the seal in a tubular PEFC having a complex seal structure in which there are many seal portions tends to be less reliable.

SUMMARY OF THE INVENTION

This invention thus provides a tubular fuel cell module having improved seal reliability, as well as a manufacturing method of that tubular fuel cell module.

An aspect of the invention therefore relates to a tubular fuel cell module provided with a tubular cell of a tubular fuel cell, and a heat transfer pipe through which flows a heating/cooling medium that selectively heats and cools the tubular cell. The heat transfer pipe includes a first straight portion, a second straight portion, and a bent portion that connects the first straight portion with the second straight portion. Further, at least a portion of the tubular cell is arranged on at least one of the first straight portion and the second straight portion.

A tubular fuel cell module may be provided with a hollow MEA, and a heat transfer pipe through which flows a heating/cooling medium that selectively heats and cools the MEA; the heat transfer pipe includes a first straight portion, a second straight portion, and a bent portion that connects the first straight portion with the second straight portion; and the MEA is arranged on at least one of an outer peripheral surface of the first straight portion and an outer peripheral surface of the second straight portion.

Further, a tubular fuel cell module may be provided with a tubular cell of a tubular fuel cell, and a heat transfer pipe through which flows a heating/cooling medium that selectively heats and cools the tubular cell; the heat transfer pipe includes a first straight portion, a second straight portion, and a bent portion that connects the first straight portion with the second straight portion; and the outer peripheral surface of at least one of the first straight portion and the second straight portion contacts the outer peripheral surface of the tubular cell.

Specific examples of the heating/cooling medium include water, ethylene glycol, and a mixture of the two, for example. As long as the heat transfer pipe is made of corrosion resistant material that can withstand the operating environment of a tubular PEFC, the constituent material is not particularly limited. However, it is easier to make the tubular fuel cell module smaller if the heat transfer pipe also serves as an external collector or an internal collector so the heat transfer pipe may also be made of material having excellent electrical conductivity as well as being corrosion resistant. Specific examples of material that is corrosion resistant and also has good electrical conductivity include material in which Ti is coated on the surface of Cu (such as Cu—Ti clad material), in addition to Au and Pt. In addition, to effectively improve the output density of the tubular fuel cell module, the axial direction of the first straight portion and the axial direction of the second straight portion in the heat transfer pipe may be parallel with each other. Further, from the same viewpoint, the tubular cells may be arranged such that the outer peripheral surfaces thereof contact the outer peripheral surfaces of the first straight portion and the second straight portion of the heat transfer pipe. The tubular cells may also be arranged such that their axial directions are parallel with the axial directions of the first straight portion and the second straight portion.

Here, the term "hollow MEA" refers to an MEA that includes at least a hollow inside catalyst layer, an outside catalyst layer arranged on the outside of the inside catalyst layer, and an electrolyte membrane sandwiched between the inside catalyst layer and the outside catalyst layer. The MEA constitutes a portion of the tubular cell.

The phrase "the MEA is arranged on at least one of an outer peripheral surface of the first straight portion and on an outer peripheral surface of the second straight portion" means that when the heat transfer pipe also serves as an internal collector, the MEA is formed on (contacts) at least one of the outer surface of the first straight portion of the heat transfer pipe and the outer surface of the second straight portion of the heat transfer pipe, and when an internal collector is provided between the heat transfer pipe and the MEA (i.e., when the heat transfer pipe does not also serve as an internal collector), the MEA is formed on the outer surface of the internal collector which is arranged on the outer surfaces of the first and second straight portions of the heat transfer pipe.

According to the foregoing aspect, adjacent first and second straight portions can be connected by the bent portion so a tubular fuel cell module can be provided which has an S-shaped heat transfer pipe having n number of straight portions and n−1 number of bent portions. In this way, by forming the heat transfer pipe in an S shape, it is possible to limit (i.e., reduce the number of) the inlets and outlets for the heating/cooling medium, which in turn enables the structure of the seal portion formed between the reaction gas and the heating/cooling medium to be simplified. Accordingly, a tubular fuel cell module having improved seal reliability by simplifying the structure of the seal portion is able to be provided.

Also, when the heat transfer pipe contacts the inside of the tubular cell (i.e., the inside of the MEA) of the tubular fuel cell, the inside of the tubular cell of the tubular fuel cell, which is particularly prone to heat build-up, can be efficiently cooled.

In the tubular fuel cell module, the first straight portion, the second straight portion, and the bent portion may be formed by bending a single heat transfer pipe.

The phrase "formed by bending a single heat transfer pipe" means that at least one portion of the heat transfer pipe is formed in the shape of the letter "U", which includes a first straight portion, a bent portion, and a second straight portion, by bending a single heat transfer pipe.

Forming the first straight portion, the second straight portion, and the bent portion by bending a single heat transfer pipe in this way obviates connections between the first and second straight portions and the bent portion, thus further improving the seal reliability.

In the tubular fuel cell module, the inlet and the outlet of the heat transfer pipe may be positioned on the same side with respect to the center in the axial direction of the tubular cell or the MEA.

Positioning the inlet and the outlet of the heat transfer pipe on the same side with respect to the center in the axial direction of the tubular cell or the MEA enables the seal portion that separates the reaction gas from the heating/cooling medium to be formed only on the side where the inlet and the outlet are located, thus enabling the structure of the seal portion to be easily simplified.

In the tubular fuel cell module, the first straight portion and the second straight portion may be arranged on a horizontal plane, and the inlet and outlet of the heat transfer pipe may also be formed facing the outside in a direction intersecting the axial direction of at least one of the first straight portion and the second straight portion when viewed from above the horizontal plane.

An example of a case in which the inlet and outlet of the heat transfer pipe is formed facing the outside in a direction intersecting the axial direction of at least one of the first straight portion and the second straight portion when viewed from above the horizontal plane is as follows. When the inlet of the heat transfer pipe is formed on an end portion of the first straight portion which does not lead into a bent portion and the outlet of the heat transfer pipe is formed on an end portion of the second straight portion which does not lead into a bent portion, the inlet of the heat transfer pipe is formed so as to open toward the side opposite the second straight portion that is adjacent to the first straight portion, and the outlet of the heat transfer pipe is formed so as to open toward the side opposite the first straight portion that is adjacent to the second straight portion. In the invention, the angle formed between the direction in which the inlet and outlet of the heat transfer pipe open and the axial direction of at least one of the first straight portion and the second straight portion is not particularly limited, although making that angle 90 degrees makes it easier to connect a plurality of the tubular fuel cell modules together.

Accordingly, when a plurality of the tubular fuel cell modules are connected together, the inlet of the heat transfer pipe of one tubular fuel cell module can easily be connected to the outlet of the heat transfer pipe of another tubular fuel cell module. Therefore, in addition to the effects described above, a tubular fuel cell module can be provided which is easier to connect to another tubular fuel cell module when a plurality of the modules are provided.

Another aspect of the invention relates to a manufacturing method of a tubular fuel cell module provided with at least one hollow MEA, and a heat transfer pipe through which flows a heating/cooling medium that selectively heats and cools the MEA. This manufacturing method includes the steps of forming the MEA around a straight tubular member, and forming a heat transfer pipe that includes a first straight portion, a second straight portion, and a bent portion that connects the first straight portion with the second straight portion, by bending the straight tubular member, thus yielding a bent body in which the MEA is formed around the heat transfer pipe. When forming the MBA, it is either formed sequentially at intervals the distance of which corresponds to at least the length of the bent portion, or the MEA formed around at least the bent portion is removed after bending the straight tubular member.

Here, the "straight tubular member" refers to the heat transfer pipe before it is bent to form the bent portion. Furthermore, the method of forming the MEA on the outside of the straight tubular member can be divided into a case in which the heat transfer pipe formed by bending the straight tubular member (hereinafter simply referred to as "heat transfer pipe") also functions as an internal collector and a case in which the heat transfer pipe does not function as an internal collector. In the case where the heat transfer pipe also functions as an internal collector, the MEA may be formed so that the outer surface of the heat transfer pipe and the inside catalyst layer of the MEA contact one another, for example. In order to make it easier to remove the MEA formed at the location corresponding to the bent portion as well as near the inlet and the outlet (hereinafter also referred to as "non-MEA sections"), a water repellent treatment or a masking member or the like is applied to the non-MEA sections beforehand. The MEA is then formed over the water-repellent treatment or masking member at the non-MEA sections, and on the outer surface of the heat transfer pipe at sections other than the non-MEA sections. In contrast, when the heat transfer pipe does not function as an internal collector, an internal collector must be arranged between the MEA and the heat transfer pipe. Therefore, the MEA is formed on the outer surface of the internal collector which is arranged so as to contact the outer surface of the heat transfer pipe. Moreover, one specific example of a method of sequentially forming the MEA at intervals the distance of which corresponds to the length of the bent portion is to intermittently apply a melted or dissolved catalyst layer component and an electrolyte membrane component. Specific examples of removing the MEA formed around the bent portion include a method of focusing a laser beam on the non-MEA section and melting the MEA at that section with heat, a method of removing the MEA from the non-MEA section by soaking that section in a solvent, and a method of removing the MEA formed on the surface of the masking member by removing the masking member that was arranged on the non-MEA section in advance.

In this way, a tubular fuel cell module is manufactured which has a simplified seal structure achieved by limiting (reducing the number of) the inlets and outlets for the heating/cooling medium. This tubular fuel cell module thus has fewer seal portions and/or the locations where the heat transfer pipe passes through the seal portions than the related art, which improves the reliability of the seal. Hence, a manufacturing method of a tubular fuel cell module having improved seal reliability is able to be provided.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
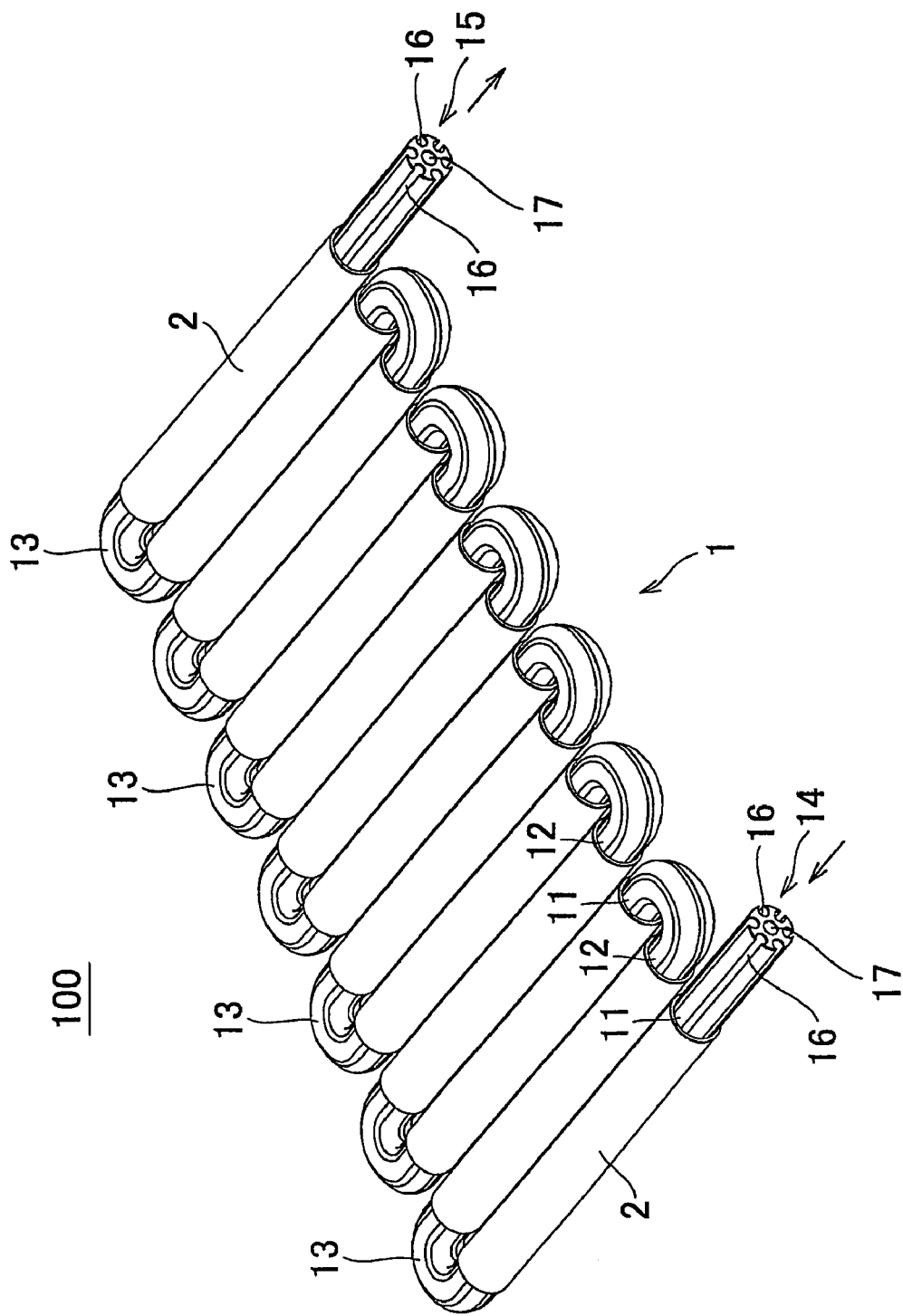
FIG. 1 is a perspective view schematically showing part of a module according to a first example embodiment of the invention.

A heat transfer pipe through which a heating/cooling medium flows is provided in a tubular PEFC module in order to keep the temperature of tubular cells within an appropriate range. In a related tubular PEFC module (hereinafter simply referred to as "related module"), the heat transfer pipe is straight. As a result, the number of locations where the heat transfer pipe passes through a seal portion or seal member (which will be described later) formed between a reaction gas diffusion region and a heating/cooling medium diffusion region is equal to the number of heat transfer pipes, which makes the seal structure complex. That is, in the related module, the heat transfer pipe passes through the seal portion at many locations so the distance between those locations is very short. As a result, the seal structure tends to be complex, which tends to reduce the reliability of the seal and thus the stability of the tubular PEFC system (hereinafter simply referred to as "system"). One way to effectively improve the reliability of the seal is to reduce the number of locations where the heat transfer pipe passes through the seal portion and/or the number of seal portions (seal members). If the stability of the system can be ensured while reducing the number of locations where the heat transfer pipe passes through the seal portion and the number of seal portions, then the system itself can be made smaller and the output density improved.

The related module is also typically provided with one heat transfer pipe for each tubular cell. The heat transfer pipes in the related module are also straight which means that there must be at least the same number of seal portions as there are heat transfer pipes provided at the boundary between the reaction gas and the heating/cooling medium. That is, the related module is provided with many seal portions and the locations where the heat transfer pipe passes through the seal portions are all clustered within a small area so the seal structure not only tends to be complex, but the seal also tends to be less reliable, which tends to reduce the stability of the system. One way to effectively improve the reliability of the seal is to reduce the number of seal portions. If the stability of the system can be ensured while reducing the number of seal portions, then the system itself can be made smaller and the output density also improved.

The invention thus provides a tubular fuel cell module which improves the seal reliability by reducing the number of locations where the heat transfer pipes pass through the seal portions and the number of seal portions to less than the number in the related module, which is achieved by providing an S-shaped heat transfer pipe and an MEA formed on the heat transfer pipe or at least one tubular cell arranged on the heat transfer pipe (i.e., by arranging at least a portion of the tubular cells on the heat transfer pipe). In the same way, the invention also provides a manufacturing method of that tubular fuel cell module.

Hereinafter, the tubular fuel cell module and the manufacturing method thereof according to example embodiments of the invention will be described in detail with reference to the drawings.

FIG. 1 is a perspective view schematically showing part of a module according to a first example embodiment of the invention. As shown in the drawing, a tubular fuel cell module (hereinafter simply referred to as "module") 100 according to the first example embodiment of the invention includes a heat transfer pipe 1 formed so as to wind back and forth in a repeating S shape, MEAs 2 formed around the heat transfer pipe, an external collector (not shown) arranged so as to contact each MEA 2, and a collector 3 (see FIG. 6) arranged so as to contact bent portions 13 of the heat transfer pipe 1. The heat transfer pipe 1 of the module 100 according to the first example embodiment of the invention also functions as an internal collector and is made by bending a single straight pipe, the base material of which is Cu—Ti clad material, to form the bent portions 13. The heat transfer pipe 1 thus includes first straight portions 11, second straight portions 12, and the bent portions 13 which connect the first straight portions 11 with the second straight portions 12. In this example embodiment, the heat transfer pipe 1 is formed so that the first straight portions 11, second straight portions 12 and the bent portions 13 are arranged on a horizontal plane. Further, the first straight portions 11 and the second straight portions 12 are arranged substantially parallel. Reaction gas flow paths 16 are formed on the outer surface of the heat transfer pipe 1 for diffusing the reaction gas inside the MEAs 2. A hole 17 is also formed in the heat transfer pipe 1 through which a heating/cooling medium (such as water; hereinafter also referred to as "water") flows. An inlet 14 and an outlet 15 are both formed in the heat transfer pipe 1 of this example embodiment on the front side.

Thus, according to the module 100 of this example embodiment, both the inlet 14 and the outlet 15 of the heat transfer pipe 1 are positioned on the front side. Therefore, the seal portion that provides a seal between the heating/cooling medium flowing through the hole 17 in the heat transfer pipe 1 and the reaction gases need only be formed at the end portion on the front side of the MEAs 2, which reduces the number of seal portions thus simplifying the seal structure. Moreover, because the inlet and outlet of the heat transfer pipe 1 are limited to only the inlet 14 and the outlet 15, only the inlet 14 and the outlet 15 pass through a seal portion (which will be described later) formed between a heating/cooling medium diffusion region and a reaction gas diffusion region. Accordingly, the heat transfer pipe passes through the seal portion at fewer locations, thereby enabling the seal structure to be simplified even more.

Figure 2:
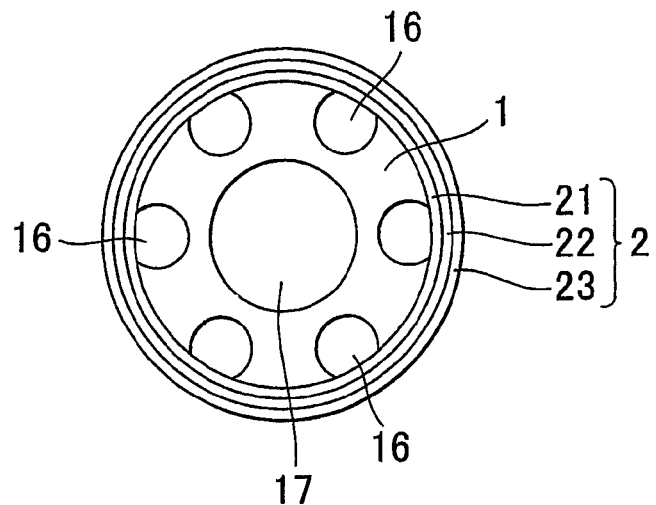
FIG. 2 is a sectional view schematically showing an example of a portion of a heat transfer pipe and an MEA according to the invention.

FIG. 2 is sectional view schematically showing a portion of the heat transfer pipe and the MEA shown in FIG. 1. The axial direction of the MEA is the direction perpendicular to the paper on which FIG. 2 is drawn. Portions and members in FIG. 2 that are the same as those shown in FIG. 1 are denoted by the same reference numerals as they are in FIG. 1 and descriptions thereof will be omitted. Hereinafter, the module according to the first example embodiment of the invention will described with reference to FIGS. 1 and 2.

As shown in FIG. 2, the MEA 2 formed on the outer surface of the heat transfer pipe 1 includes an inside catalyst layer 21, an electrolyte membrane 22 formed on the outside of the inside catalyst layer 21, and an outside catalyst layer 23 formed on the outside of the electrolyte membrane 22. The inner surface of the inside catalyst layer 21 contacts the outer surface of the heat transfer pipe 1. A hole 17 forming the heating/cooling medium flow path, as well as reaction gas flow paths 16 are formed in the heat transfer pipe 1 which also functions as an internal collector. In this way, with the module 100 in the first example embodiment of the invention, a reaction gas (either a gas containing hydrogen or a gas containing oxygen) is supplied to the inside catalyst layer 21 via the reaction gas flow paths 16 formed in the heat transfer pipe 1 and the electricity generated by the MEA 2 is collected in the axial direction of the MEA 2 by the heat transfer pipe 1. Further, the heat transfer pipe 1 contacts the inside catalyst layer 21 so the temperature of the MEA 2 can be regulated by heating or cooling the MEA 2 by supplying cold or heated water or the like through the hole 17.

Figure 3:
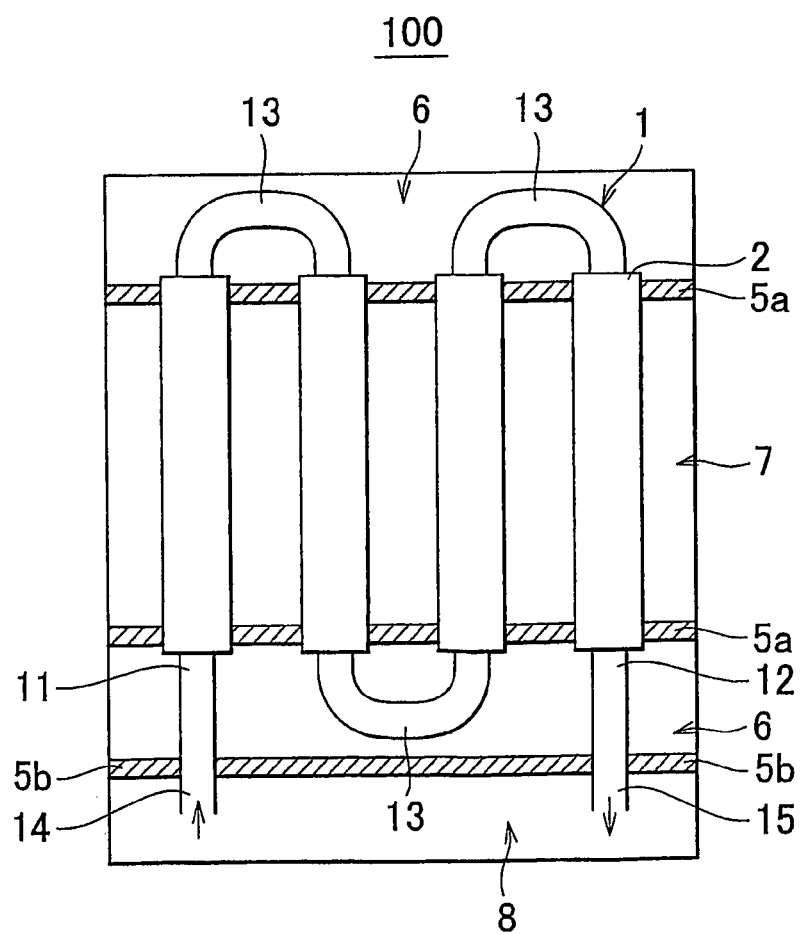
FIG. 3 is a sectional view schematically showing a seal portion of the module according to the first example embodiment of the invention.
Figure 4:
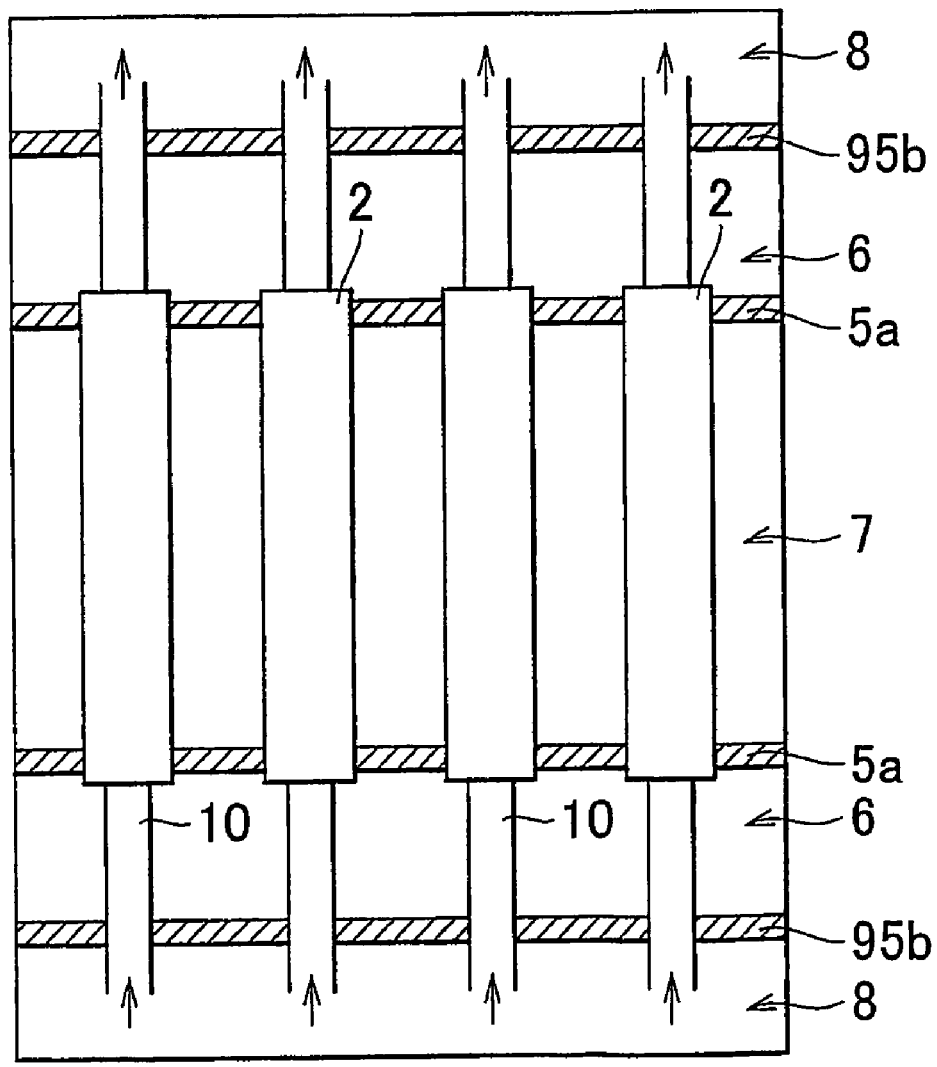
FIG. 4 is a sectional view schematically showing a seal portion of a related module.

FIG. 3 is a sectional view schematically showing a seal portion of the module according to the first example embodiment of the invention, and FIG. 4 is a sectional view schematically showing a seal portion of a related module. The axial direction of the MEAs is the longitudinal direction of the paper on which the drawings are drawn. FIG. 3 shows an expanded view of a portion of the heat transfer pipe, the MEAs, and the seal portion (seal member) provided in the module according to the first example embodiment of the invention. The drawing shows the heat transfer pipe having three bent portions, but the heat transfer pipe provided in the module of the invention is not limited to this structure. On the other hand, FIG. 4 shows the structure of a related module having the same number of straight heat transfer pipes as there are straight portions of the heat transfer pipe shown in FIG. 3, as well as the seal portions thereof. In FIGS. 3 and 4, constituent elements of the module that are the same as those shown in FIG. 1 will be denoted by the same reference numerals as they are in FIG. 1 and descriptions thereof will be omitted. Also, in FIGS. 3 and 4, the intake ports and discharge ports for the hydrogen, air (oxygen), and water are omitted. Further, the drawings emphasize the seal portion arranged between the diffusion region of the gas containing hydrogen and the diffusion region of the gas containing oxygen, i.e., between reaction gas diffusion regions, and the seal portion arranged between the diffusion region of the gas containing hydrogen and the heating/cooling medium diffusion region. The straight arrows in FIGS. 3 and 4 point in the direction in which the water flows inside the heat transfer pipe.

As shown in FIG. 3, the module 100 in this example embodiment includes the heat transfer pipe 1 and the MEAs 2 arranged on the outer surface of the heat transfer pipe 1. The heat transfer pipe 1 is made by bending a single straight pipe, the base material of which is Cu—Ti clad material, to form the bent portions 13. The heat transfer pipe 1 thus includes the first straight portions 11 the second straight portions 12, and the bent portions 13 which connect the first straight portions 11 with the second straight portions 12. The module 100 in the drawing is structured such that the center portion is a diffusion region of the gas containing oxygen (hereinafter referred to as "oxygen diffusion region") 7 and the region on both sides of the oxygen diffusion region is a diffusion region of the gas containing hydrogen (hereinafter referred to as "hydrogen diffusion region") 6. Seal portions 5a are provided between the oxygen diffusion region 7 and the hydrogen diffusion regions 6, and a seal portion 5b is formed between the hydrogen diffusion region 6 and a heating/cooling medium diffusion region (hereinafter also referred to as "water diffusion region") 8. Thus the module 100 according to this first example embodiment of the invention enables the structure of the seal portion to be simplified by having only the inlet 14 and the outlet 15 of the heat transfer pipe 1 pass through the seal portion 5b.

In contrast, a related module 900 shown in FIG. 4 includes straight heat transfer pipes 10 and MEAs 2 arranged on the outer peripheral surfaces of the heat transfer pipes 10. Similar to the module 100 shown in FIG. 3, the module 900 in FIG. 4 is structured such that the center portion is the oxygen diffusion region 7, the region on both sides of the oxygen diffusion region 7 is the hydrogen diffusion region 6, the seal portions 5a are arranged between the oxygen diffusion region 7 and the hydrogen diffusion regions 6, and seal portions 95b and 95b are arranged between the hydrogen diffusion region 7 and the water diffusion regions 8. In the related module 900, when the number of heat transfer pipes 10 is "t", the number of locations where the heat transfer pipes 10 pass through each seal portion 95b is also "t", which complicates the seal structure and in turn tends to make the seal less reliable.

As shown in FIGS. 3 and 4, the heat transfer pipe 1 of the module 100 according to the first example embodiment of the invention is formed winding back and forth in a repeating S shape which both increases the distance between the locations where the heat transfer pipe 1 passes through the seal portion Sb, as well as reduces the number of those locations, thereby improving the reliability of the seal. Furthermore, the module 100 according to the first example embodiment of the invention also obviates the need to provide a heating/cooling medium diffusion region on both ends of the module, which reduces the number of seal portions and enables the module to be made smaller, as well as improves the output density of the module 100.

In the foregoing description, the inlet and the outlet of the heat transfer pipe are positioned on the same side with respect to the center in the axial direction of the MEAS. The heat transfer pipe in the module of the invention is not limited to this structure, however. Alternatively, the inlet and the outlet of the heat transfer pipe may be positioned on opposite sides with respect to the center in the axial direction of the MEAs. Positioning the inlet and the outlet of the heat transfer pipe on the same side with respect to the center in the axial direction of the MEAs, however, makes it easier to make the module smaller.

Figure 5:
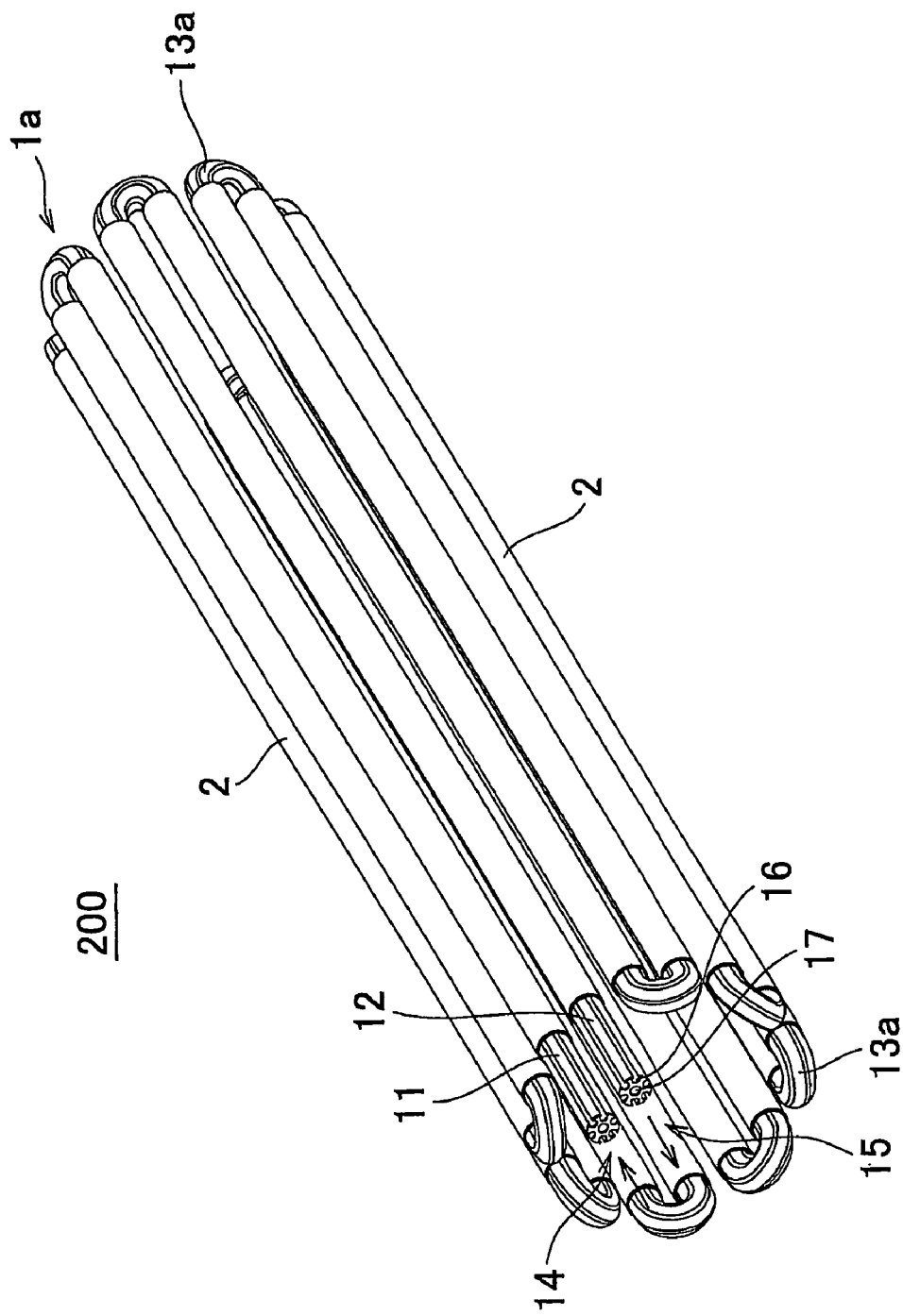
FIG. 5 is a perspective view schematically showing part of a module according to a second example embodiment of the invention.

Also, in the foregoing module 100, the heat transfer pipe 1 includes the first straight portions 11, the second straight portions 12 and the bent portions 13 arranged on a horizontal plane. The heat transfer pipe in the module of the invention is not limited to this arrangement, however. FIG. 5 shows another example of how the heat transfer pipe in the module of the invention can be arranged.

FIG. 5 is a perspective view schematically showing part of a module according to a second example embodiment of the invention. The constituent elements of the module shown in FIG. 5 that are the same as those shown in FIG. 1 are denoted by the same reference numerals used in FIG. 1 and descriptions of those elements will be omitted.

As shown in FIG. 5, a module 200 according to the second example embodiment of the invention includes a heat transfer pipe 1a, MEAs 2 formed on the outside of the heat transfer pipe 1a, an external collector (not shown) arranged so as to contact each MEA 2, and a collector (also not shown) arranged so as to contact bent portions 13a of the heat transfer pipe 1a. As shown in the drawing, the heat transfer pipe 1a according to this second example embodiment is such that first straight portions 11, second straight portions 12, and the bent portions 13a that connect the first straight portions 11 with the second straight portion 12 are formed in a generally cylindrical shape and an inlet 14 and an outlet 15 of the heat transfer pipe 1a are adjacent to one another. In this example embodiment, the heat transfer pipe 1a also functions as an internal collector and is made by bending a single straight pipe, the base material of which is Cu—Ti clad material, to form the bent portions 13a. Reaction gas flow paths 16 are formed on the outer surface of the heat transfer pipe 1 for diffusing the reaction gas inside the MEAs 2. A hole 17 is also formed in the heat transfer pipe 1a through which a heating/cooling medium such as water flows.

Thus the module 200 according to this second example embodiment enables the structure of the seal to be simplified by having the inlet 14 and the outlet 15 of the heat transfer pipe 1a adjacent to one another.

Moreover, in this module 200 according to the second example embodiment, the heat transfer pipe 1a is formed generally cylindrical which improves the strength of the module on the whole, as well as makes the module easier to handle. On the other hand, with the module 100 according to the first example embodiment, the heat transfer pipe 1 is disposed on a horizontal plane which makes it easily to ensure space between the MEAs 2. Also in this case, there is no space in the center as there is when the heat transfer pipe 1a is formed generally cylindrical, which makes it easier to improve the output density. Accordingly, from the viewpoint of improving output density, the module 100 according to the first example embodiment is preferable. On the other hand, from the viewpoint of making the module easier to handle, the module 200 according to the second example embodiment is preferable.

Figure 6:
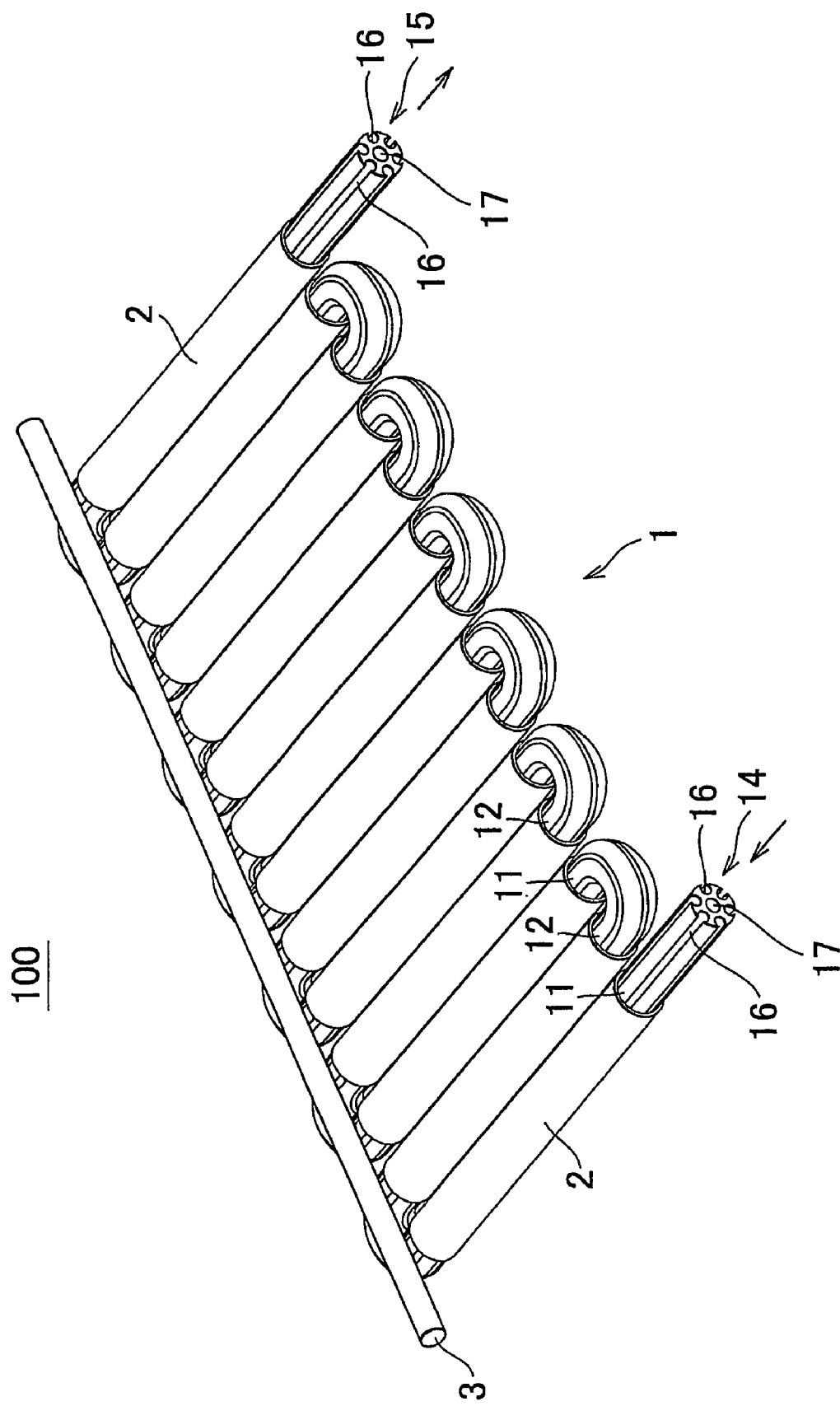
FIG. 6 is a perspective view schematically showing part of the module according to the first example embodiment of the invention.

To make to the structures of the modules according to the example embodiments of the invention easier to understand, the collector which is arranged contacting the bent portions has been omitted in FIGS. 1 to 5. Although not shown, this collector is provided in the modules according to the example embodiments of the invention to improve power collecting efficiency in the direction; intersecting the axial direction of the MEAs. FIG. 6 schematically shows a module provided with the collector arranged contacting the bent portions.

FIG. 6 is a perspective view schematically showing an example of the module according to the first example embodiment of the invention. In the drawing, the module 100 of the invention is provided with a collector 3 that contacts the bent portions 13 on the side opposite the side on which the inlet 14 and the outlet 15 of the heat transfer pipe 1 are located. Thus the module according to this example embodiment of the invention is provided with a collector that contacts the bent portions of the heat transfer pipe, which improves power collecting efficiency in the direction intersecting the axial direction of the MEAs. Incidentally, the example shown in FIG. 6 is one in which the collector 3 is arranged so as to contact the bent portions 13 on the side opposite the side on which the inlet 14 and the outlet 15 of the heat transfer pipe 1 are located. The invention is not limited to this structure, however. Alternatively, the collector may be arranged so as to contact the bent portions on the same side as the side on which the inlet and the outlet of the heat transfer pipe are located, or a first collector may be arranged so as to contact the bent portions on one side and a second collector may be arranged so as to contact the bent portions on the other side. Of these structures, the structure in which the first collector and the second collector are provided is preferable from the viewpoint of further improving the power collecting efficiency.

In the foregoing description, hydrogen is supplied to the inside of the MEAs and air (oxygen) is supplied to the outside of the MEAs, but the invention is not limited to this. Conversely, air may be supplied to the inside of the MEAs and hydrogen supplied to the outside of the MEAs.

Figure 7:
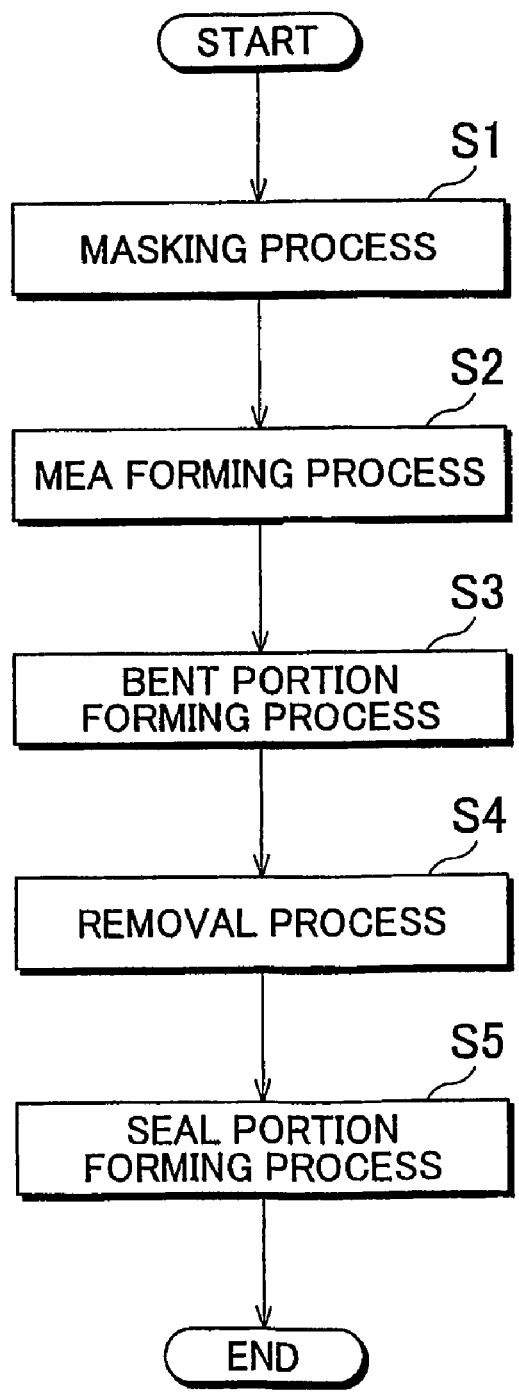
FIG. 7 is a schematic of a simplified example of a manufacturing process of the module of the invention.

FIG. 7 shows a simplified example of a method for manufacturing the tubular fuel cell module according to the foregoing example embodiments of the invention. The module of the invention may also be provided with a heat transfer pipe that only serves to heat or cool the MEA, but to make it easier to make the module smaller by reducing the number of constituent members, the heat transfer pipe preferably also functions as an internal collector as described above. Therefore, an example of a manufacturing process of a module provided with a heat transfer pipe that also functions as an internal collector will be described. Further, in the manufacturing method according to the example embodiment of the invention, two methods are conceivable for forming the MEAs on the surfaces of the straight portions of the heat transfer pipe while having the surface of the bent portions of the heat transfer pipe be uncovered, as shown in FIG. 1, for example. These methods are: (1) a method of forming MEAs only on those surfaces to be covered with MEAs and not forming MEAs on surfaces not to be covered with MEAs (i.e., non-MEA sections), and (2) a method of forming an MEA on the outer surface of the entire heat transfer pipe and then removing the MEA from the non-MEA sections. A specific example (2a) of the second method (2) is to form the MEA after first arranging a masking member on the non-MEA sections, and then remove the masking member (with the MEA formed thereon) after the MEA is formed. Hereinafter, the method of (2a) will be described in detail while only a general outline of the other methods will be described. Hereinafter, the manufacturing method of the tubular fuel cell module according to the example embodiment of the invention will be described while using the reference numerals used in FIGS. 1 to 3 as appropriate. When the heat transfer pipe also functions as an internal collector, the surface of the heat transfer pipe that contacts the heating/cooling medium (such as the inside surface) may be coated with insulating material to prevent electrical leakage and the like.

According to the manufacturing method of the tubular fuel cell according to the example embodiment of the invention, a straight heat transfer pipe having a hole 17 and grooves 16 is first prepared and an MEA 2 is formed on the outer surface of the heat transfer pipe. The constituent material of the electrolyte membrane 22 of the MEA 2 may be, for example, a fluorine-containing ion-exchange resin. The constituent material of the inside catalyst layer 21 and the outside catalyst layer 23 may be, for example, a mixture of fluorine-containing ion-exchange resin and platinum-carrying carbon.

To form the MEA 2 on the outer surface of the straight heat transfer pipe, the masking member is arranged (step S1; masking process) on the outer surface of the non-MEA sections of the heat transfer pipe (i.e., the sections corresponding to the bent portions 13 and the areas near the inlet 14 and the outlet 15 of the heat transfer pipe), for example. Then the inside catalyst layer 21 is formed on the outer surface of the heat transfer pipe of which a portion of the outer surface is covered with the masking member by, for example, applying a catalyst ink in which a catalyst such as platinum-carrying carbon is dispersed in a solution including fluorine-containing ion-exchange resin or the like that has been dissolved using an organic solvent, and then drying that catalyst ink. Next, the electrolyte membrane 22 is formed by applying a fluorine-containing ion-exchange resin or the like (hereinafter referred to as "electrolyte component") that has been dissolved using an organic solvent to the surface of the inside catalyst layer 21 and drying that electrolyte component. Then an outside catalyst layer 23 is formed by applying the catalyst ink to the surface of the electrolyte membrane 22 and drying it, thus resulting in an MBA 2 formed on the outer surface of the heat transfer pipe (step S2; MEA forming process).

In this way, after the MEA 2 is formed on the outer surface of the straight heat transfer pipe, the bent portions 13 are formed at the sections where the masking member was arranged in step S1, which correspond to the bent portions, by sequentially bending those sections (step S3; bent portion forming process). Then after step S3, the module 100 as shown in FIG. 1 (hereinafter also referred to as "bent body") is made by removing the masking member, thereby removing the MBA 2 formed on the outer surface of the non-MEA sections (step S4; removal process). After the bent body is formed in that step, the seal portion 5a which separates the hydrogen from the air (oxygen) is then formed, and the seal portion 5b is formed around the inlet 14 and the outlet 15 of the heat transfer pipe (step S5; seal portion forming process). After step S5 is complete, the module of the invention can be manufactured through a process such as placing the bent body provided with the seal portions that was manufactured in steps S1 to S5 into a predetermined case. Because the module 100 manufactured through these steps is provided with the S-shaped heat transfer pipe 1, the number of seal portions can be reduced. Therefore, this example embodiment of the invention is able to provide a manufacturing method of a tubular fuel cell module having increased seal reliability.

Heretofore, method (2a) above was described as a manufacturing method of the example embodiment of the invention, but the manufacturing method of the invention is not limited to that method. One specific example of the method of forming MEAs only on those surfaces to be covered with MEAs and not forming MEAs on surfaces not to be covered with MEAs (i.e., method (1) above) is to intermittently apply the catalyst ink and electrolyte component to the outer surface of the straight heat transfer pipe while avoiding the non-MEA sections (i.e., intermittent application). Also, other specific examples of the method of first forming an MEA on the outer surface of the entire heat transfer pipe and then removing the MEA from the non-MBA sections (i.e., method (2) above) include soaking only the non-MEA sections in a solvent to dissolve and remove the MBA from those sections, or focusing a laser beam on only the non-MBA sections to melt and remove the MEA from those sections. In addition, another specific example of method (2) above is to apply a water repellent treatment which makes it difficult for the MEA to form to the non-MEA sections beforehand and then removing the MEA at those sections by cleaning them using high pressure or the like. When the intermittent application method is used here, the masking member may be applied to the non-MEA sections beforehand and then removed after intermittent application.

When using a masking member in the manufacturing method of the invention, the material of the masking member and the manner of masking are not particularly limited as long as they inhibit the catalyst ink and electrolyte component from adhering to the outer surface of the heat transfer pipe. Specific examples of the material of which the masking member is made include polyethylene resin, polypropylene resin, and a blend of the two.

In the foregoing example embodiment, an example was given in which an MEA is formed on the outside of a heat transfer pipe having a hole and grooves, and the MEA includes a hollow inside catalyst layer, a hollow electrolyte membrane, and a hollow outside catalyst layer having substantially the same axial center as the heat transfer pipe. The module of the invention, however, is not limited to this. That is, the module of the invention may alternatively include a bent body in which, for example, a plurality of internal collectors formed of wire rods are arranged contacting the outer surface of a straight portion of a heat transfer pipe formed in a repeating S shape, a plurality of wire rods on which an inside catalyst layer is formed are arranged (provided) on the outside of the internal connectors, and an electrolyte membrane and an outside catalyst layer are formed in that order on the outside of the wire rods having the inside catalyst layer. With this structure as well, as long as the heat transfer pipe is S shaped, the number of seal portions can be reduced, making it possible to provide both a tubular fuel cell module having improved seal reliability and the manufacturing method of that tubular fuel cell module.

Figure 8:
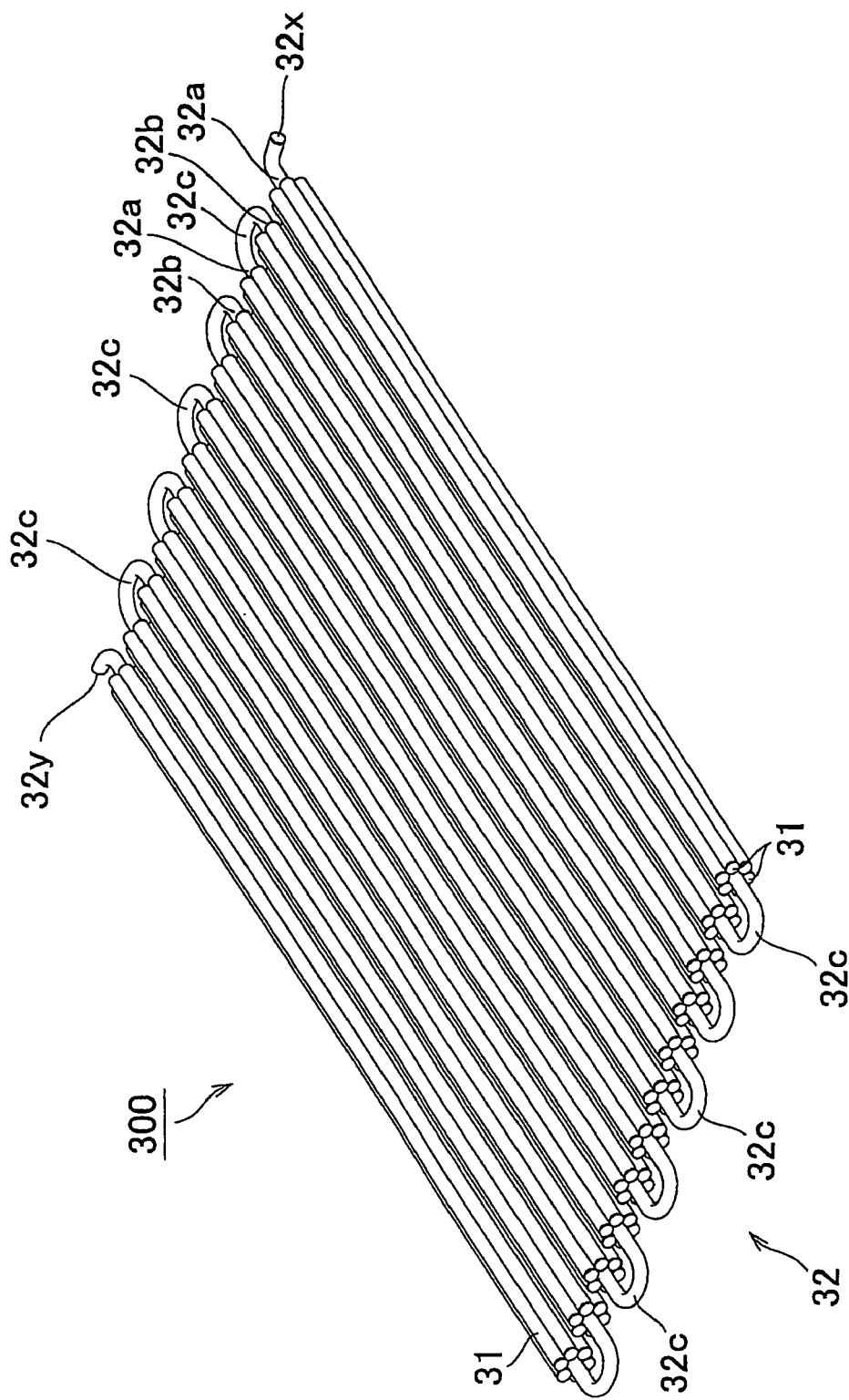
FIG. 8 is an external view of a tubular fuel cell module according to a third example embodiment of the invention.

FIG. 8 is an external view schematically showing a portion of a tubular fuel cell module according to a third example embodiment of the invention. As shown in the drawing, a module 300 according to the third example embodiment of the invention includes a plurality of tubular fuel cell cells 31, and a heat transfer pipe 32 arranged so as to contact the outer peripheral surfaces of the plurality of tubular fuel cell cells 31. The heat transfer pipe 32 is made by bending a single straight pipe, the base material of which is Cu—Ti clad material, to form bent portions 32c, and thus includes first straight portions 32a, second straight portions 32b, and the bent portions 32c that connect the first straight portions 32a and the second straight portions 32b. An inlet 32x and an outlet 32y of the heat transfer pipe 32 are positioned on the upper side of the drawing, and are formed such that the direction in which they open is at a 90 degree angle from the axial direction of the first straight portions 32a and the second straight portions 32b. The feat transfer pipe 31 according to the third example embodiment also functions as an external collector.

Thus, in the module 300 according to this example embodiment, the inlet 32x and the outlet 32y of the heat transfer pipe 32 are both positioned on the upper side in the drawing. As a result, the seal portions which provide a seal between the reaction gases and the heating/cooling medium flowing through the heat transfer pipe 32 (to be described later) need only be formed at the end portions of the tubular cells 31 that are on the upper side in the drawing, which enables the seal structure to be simplified. Moreover, because the inlet and outlet of the heat transfer pipe 32 are limited to only the inlet 32x and the outlet 32y, the seal portion provided between the heating/cooling medium and the reaction gas diffusion region need only be arranged near the inlet 32x and the outlet 32y, thereby enabling the seal structure to be simplified even more. In addition, the inlet 32x and the outlet 32y of the heat transfer pipe 32 both face to the outside so the direction of the openings of the inlet 32x and the outlet 32y intersect the axial direction of the tubular cells 31. As a result, the seal portion that provides a seal between the heating/cooling medium and the reaction gas can be formed so that the perpendicular line of the seal portion extends in a direction other than the axial direction of the tubular cells 31, which enables the number of seal portions formed in the axial direction of the tubular cells 31 to be reduced. Simplifying the seal structure in this way improves the reliability of the seals in the module 300.

Figure 9A:
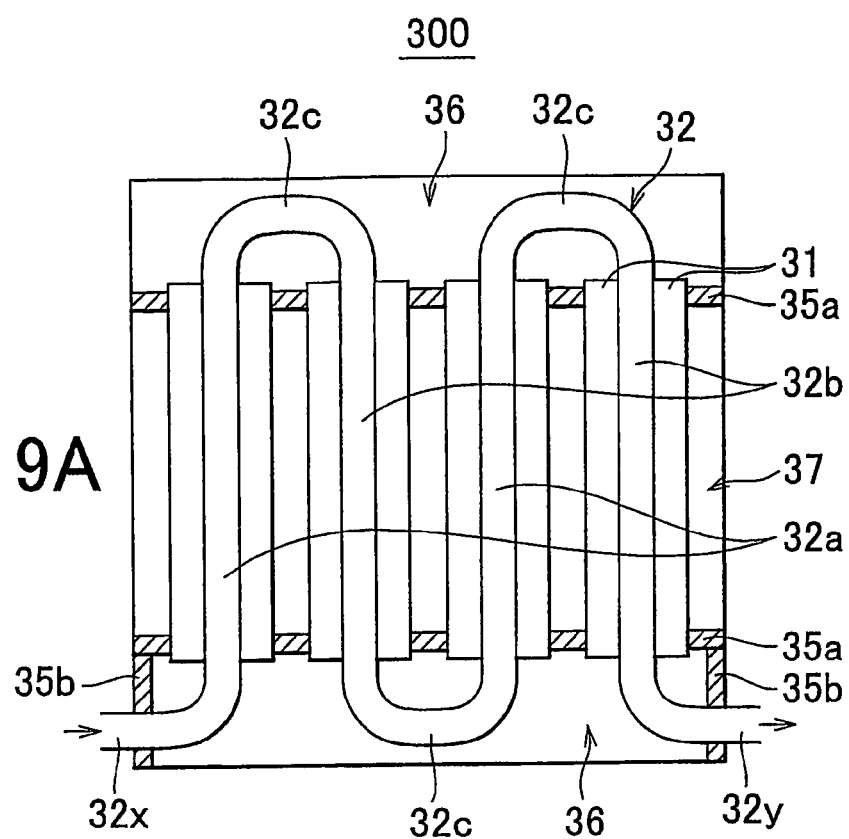
FIG. 9A and FIG. 9B are sectional views of a seal portion of the module according to the third example embodiment of the invention and a seal portion of a related module, respectively.
Figure 9B:
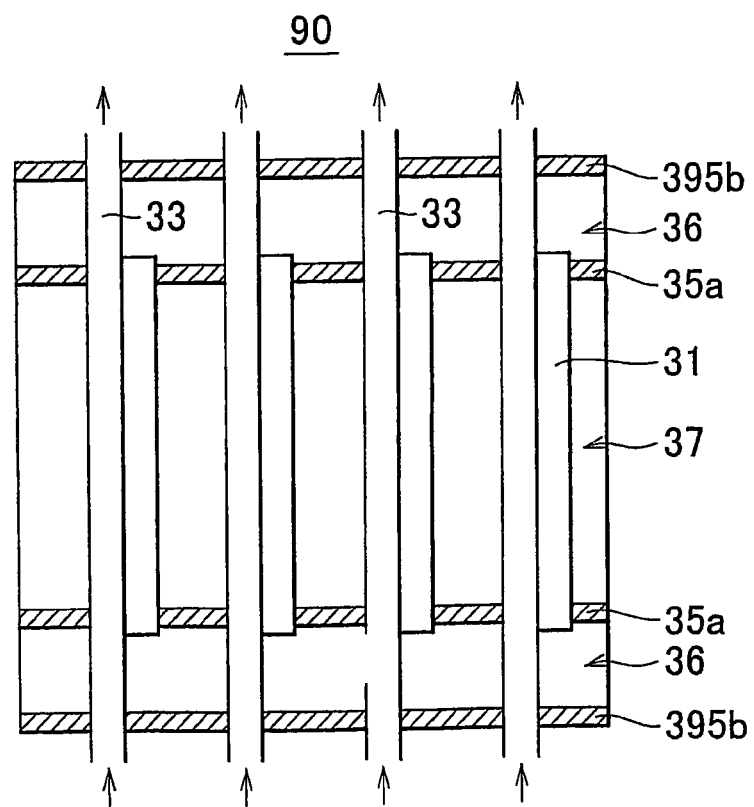

FIG. 9A and FIG. 9B are sectional views schematically showing structural examples of a seal portion in the module according to the third example embodiment of the invention and a seal portion in a related module, respectively. FIG. 9A shows an enlarged view of only a portion of the seal portion (seal member), the tubular cell, and the heat transfer pipe provided in the module according to the third example embodiment of the invention. In the drawing, the heat transfer pipe is shown having three bent portions, though the heat transfer pipe provided in the module of the invention is not limited to this structure. FIG. 9B on the other hand shows the structure of a related module provided with the same number of straight heat transfer pipes as there are straight portions of the heat transfer pipe shown in FIG. 9A, as well as the structure of the seal portion of that related module. In FIGS. 9A and 9B, constituent elements of the module that are the same as those shown in FIG. 8 will be denoted by the same reference numerals as they are in FIG. 8 and descriptions thereof will be omitted. Also, in FIGS. 9A and 9B, the intake ports and discharge ports for the hydrogen, air (oxygen), and water are omitted and the seal portion arranged between the hydrogen diffusion region and the air (oxygen) diffusion region, i.e., the reaction gas diffusion regions, and the seal portion arranged around the heat transfer pipe are shown emphasized. The straight arrows in FIGS. 9A and 9B point in the direction in which the heating/cooling medium flows inside the heat transfer pipe.

As shown in FIG. 9A, a module 300 according to the third example embodiment of the invention includes the heat transfer pipe 32 and the plurality of tubular cells 31 arranged on the outer peripheral surface of the heat transfer pipe 32. The heat transfer pipe 32 is made by bending a single straight pipe, the base material of which is Cu—Ti clad material, to form bent portions 32c. The heat transfer pipe 32 thus includes first straight portions 32a, second straight portions 32b, and the bent portions 32c which connect the first straight portions 32a with the second straight portions 32b. The module 300 in the drawing is structured such that the center portion is an oxygen diffusion region 37 and the both end portions are hydrogen diffusion regions 36. A seal portion 35a is provided between the oxygen diffusion region 37 and each hydrogen diffusion region 36, and a seal portion 35b is formed around the inlet 32x and the outlet 32y of the heat transfer pipe 32. Thus the module 300 of the third example embodiment enables the hydrogen diffusion region to be sealed by arranging the seal portion 35b formed around the heat transfer pipe 32 only at the inlet 32x and the outlet 32y of the heat transfer pipe 32.

In contrast, a related module 90 shown in FIG. 9B includes straight heat transfer pipes 33 and tubular cells 31 arranged on the outer peripheral surface of the heat transfer pipes 33. Similar to the module 300 shown in FIG. 9A, the module 90 in FIG. 9B is structured such that the center portion is the oxygen diffusion region 37 and both end portions are hydrogen diffusion regions 36, the seal portion 35a is arranged between the oxygen diffusion region 37 and both of the hydrogen diffusion regions 36, seal portions 395b are arranged around the heat transfer pipes 33 in the hydrogen diffusion regions 36. In the related module 90, when the number of heat transfer pipes 33 is "t", the number of locations where the heat transfer pipes 33 pass through the two seal portions 395b must be "2t", so the number of locations where the heat transfer pipes 33 pass through the two seal portions 395b increases depending on the number of heat transfer pipes 33.

As shown in FIGS. 9A and 9B, the heat transfer pipe 32 of the module 300 according to the third example embodiment of the invention is formed winding back and forth in a repeating S shape which reduces the number of locations where the heat transfer pipe 32 passes through the seal portions 35b, thereby improving the reliability of the seal, as well as enabling the module 300 to be made smaller and improving the output density of the module 300.

In the foregoing third example embodiment, the inlet and the outlet of the heat transfer pipe are positioned on the same side with respect to the center in the axial direction of the tubular cell. The heat transfer pipe in the module of the invention is not limited to this structure, however. Alternatively, the inlet and the outlet of the heat transfer pipe may be positioned on opposite sides with respect to the center in the axial direction of the tubular cell. Positioning the inlet and the outlet of the heat transfer pipe on the same side with respect to the center in the axial direction of the tubular cell, however, makes it easier to connect the inlet of the heat transfer pipe provided in one module with the outlet of a heat transfer pipe provided in another module.

Figure 10:
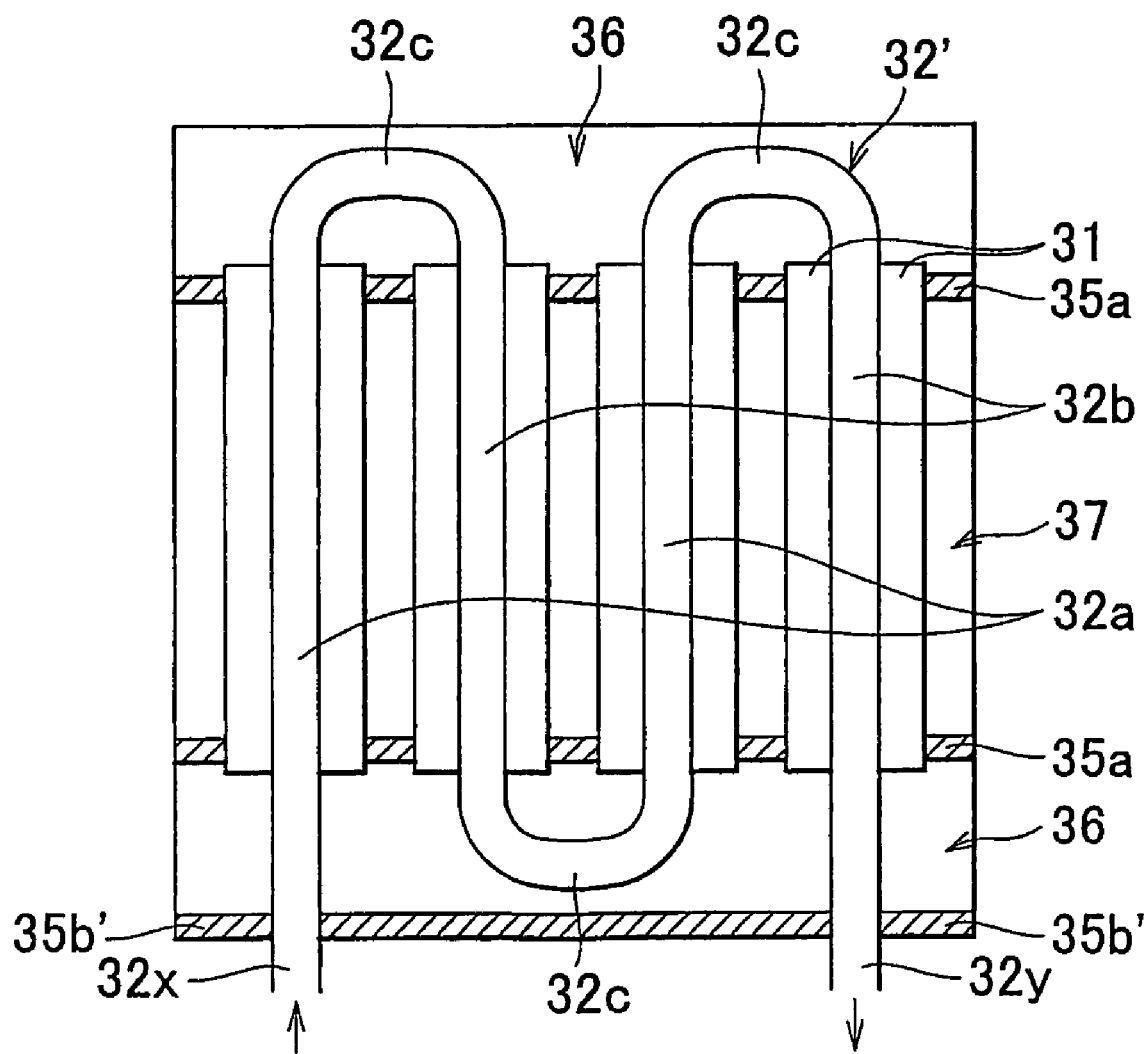
FIG. 10 is a sectional view of a seal portion of a module according to a fourth example embodiment of the invention.

Also, in the third example embodiment, the heat transfer pipe is formed so that the first straight portions, the second straight portions and the bent portions are arranged in an horizontal plane, and the inlet and the outlet of the heat transfer pipe are formed facing the outside in a direction intersecting (i.e., more specifically, in a direction substantially orthogonal to) the axial direction of the first and second straight portions of the heat transfer pipe when viewed from above the horizontal plane (see FIGS. 8, 9A and 9B). The heat transfer pipe is not limited to this structure, however. FIG. 10 shows another example of how the heat transfer pipe in the module of the invention can be arranged.

FIG. 10 is a sectional view schematically showing an example structure of a seal portion of a module according to a fourth example embodiment of the invention. The drawing shows only a portion of the seal portion, the tubular cell, and the heat transfer pipe enlarged. FIG. 10, which corresponds to FIG. 9A, shows the heat transfer pipe having three bent portions, but the heat transfer pipe provided in the module of the invention is not limited to this structure. In FIG. 10, constituent elements of the module that are the same as those shown in FIG. 9A will be denoted by the same reference numerals as they are in FIG. 9A and descriptions thereof will be omitted. Also, in FIG. 10, the intake ports and discharge ports for the hydrogen, air, and water are omitted and the seal portion arranged between the hydrogen diffusion region and the air (oxygen) diffusion region, as well as the seal portion arranged around the heat transfer pipe are shown emphasized. The straight arrows in FIG. 10 point in the direction in which the heating/cooling medium flows inside the heat transfer pipe.

As shown in FIG. 10, a module 400 according to the fourth example embodiment of the invention includes a heat transfer pipe 32' and a plurality of tubular cells 31 arranged on the outer peripheral surface of the heat transfer pipe 32'. The heat transfer pipe 32' is made by bending a single straight pipe, the base material of which is Cu—Ti clad material, to form bent portions 32c, and thus includes first straight portions 32a, second straight portions 32b, and the bent portions 32c which connect the first straight portions 32a with the second straight portions 32b. The module 400 in the drawing is structured such that the center portion is an oxygen diffusion region 37 and both end portions are hydrogen diffusion regions 36. A seal portion 35a is provided between the oxygen diffusion region 37 and each hydrogen diffusion region 36, and a seal portion 35b' is formed around the inlet 32x and the outlet 32y of the heat transfer pipe 32'. Therefore, even in the module 400 in which the direction that the inlet 32x and the outlet 32y of the heat transfer pipe 32' open are the same as the axial direction of the first straight portions 32a and the second straight portions 32b, the length of the seal portion 35b' between the inlet 32x and the outlet 32y of the heat transfer pipe 32' is able to be greater than it was conventionally. As a result, the number of locations where the heat transfer pipe 32' passes through the seal portion 35b' can be reduced so the seal structure can be simplified. That is, the module 400 according to this fourth example embodiment of the invention has fewer locations where the heat transfer pipe passes through the seal portion than the related module, which not only improves the reliability of the seal, but also enables the module to be smaller and improves the output density of the module.

Figure 11:
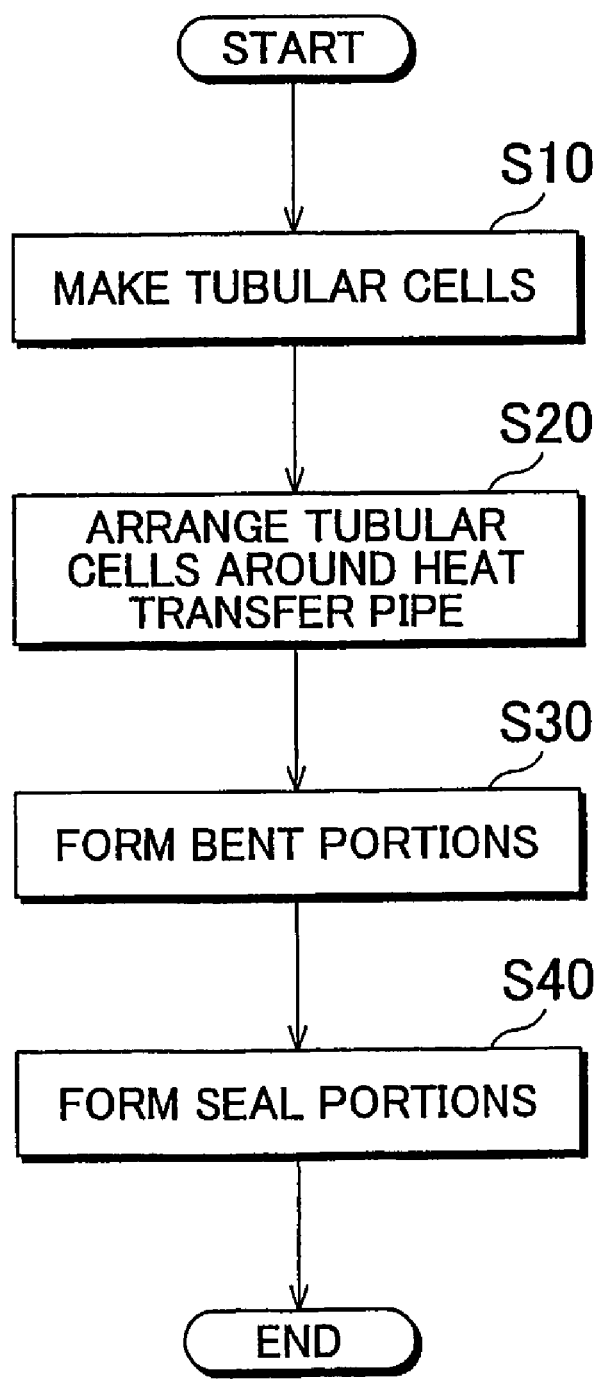
FIG. 11 is a schematic of an example of a manufacturing process of the module of the invention.

FIG. 11 shows a simplified example of a manufacturing process of the module according to the third or fourth example embodiment described above. In the module of the invention, a heat transfer pipe may be provided which functions only to selectively heat and cool (i.e., regulate the temperature of) the tubular cell, but to make it easier to make the module smaller by reducing the number of constituent members, the heat transfer pipe provided may also serve as the exterior collector, as described above. When the heat transfer pipe also serves as the exterior collector in this way, the surface (e.g., the inside surface) of the heat transfer pipe that contacts the heating/cooling medium may be covered with insulating material to prevent electrical leakage Hereinafter, an example of a manufacturing process of a module provided with a heat transfer pipe that also serves as the external collector will be described.

The module according to the third or fourth example embodiment described above is provided with a heat transfer pipe and a plurality of tubular cells that are arranged on the outer peripheral surface of the heat transfer pipe. Thus, the tubular cells must be made when manufacturing the module. The constituent material of the electrolyte membrane provided in the tubular cells may be, for example, a fluorine-containing ion-exchange resin. Also, the constituent material of the catalyst layer may be, for example, a mixture of fluorine-containing ion-exchange resin and platinum-carrying carbon. The tubular cells are then made by, for example, forming a catalyst layer on the surface of an internal collector in which spaces (e.g., grooves) for allowing reaction gas to flow are formed in the outer peripheral surface of Cu—Ti clad material, for example. The catalyst layer is formed by applying a catalyst ink in which a catalyst such as platinum-carrying carbon is dispersed in a solution including fluorine-containing ion-exchange resin or the like that has been dissolved using an organic solvent, and then drying that catalyst ink. Next, an electrolyte membrane is formed by applying a fluorine-containing ion-exchange resin or the like that has been dissolved using an organic solvent to the surface of the catalyst layer and drying it. Then a catalyst layer is formed by applying the catalyst ink to the surface of the electrolyte membrane and drying it. Thus, an MEA which includes a catalyst layer, an electrode membrane and another catalyst layer is made on the outer peripheral surface of the internal collector. In this way, the tubular cells which are arranged on the outer peripheral surface of the heat transfer pipe are made (step S10; tubular cell making process).

Once the tubular cells have been manufactured by the method described above, for example, the plurality of tubular cells are then arranged (i.e., fixed) on the outer peripheral surface of the straight heat transfer pipe at intervals that enable the bent portions to be formed (step S20; tubular cell arranging process). Once the plurality of tubular cells have been arranged at the predetermined intervals on the outer peripheral surface of the heat transfer pipe, the heat transfer pipe is then formed into a repeating S shape by sequentially bending it at locations where the tubular cells are not arranged (step S30; bent portion forming process). Next, seal portions which separate the hydrogen from the air (oxygen) are then formed, as are the seal portions near the inlet and the outlet of the heat transfer pipe (step S40; seal portion forming process). After step S40 is complete, the module in this example embodiment of the invention can be manufactured through a process such as placing the article manufactured according to steps S10 to S40 into a predetermined case.

In the foregoing example embodiments, a module provided with a heat transfer pipe made of Cu—Ti clad material was given as an example, but the constituent material of the heat transfer pipe of the invention is not limited to this. For example, the constituent material of the heat transfer pipe used in the module of the invention may be Au or Pt or the like instead of Cu—Ti clad material.

Furthermore, in the foregoing description, a heat transfer pipe having the first straight portions, the second straight portions, and the bent portions is made by bending a single straight pipe to form the bent portions. However, the heat transfer pipe of the invention is not limited to this. For example, the heat transfer pipe of the invention may also be formed by connecting U-shaped pipes with straight pipes, for example. While a heat transfer pipe having this kind of structure also enables the number of seal portions between the hydrogen diffusion region and heating/cooling medium and/ or the number of locations where the heat transfer pipe passes through the seal portions to be reduced, it also requires a process of connecting the straight pipes to the U-shaped pipes during manufacturing. Therefore, from the viewpoint of improving workability when manufacturing the module of the invention, it is preferable to form the bent portions by bending a straight heat transfer pipe. The heating/cooling medium flowing through the heat transfer pipe provided in the module of the invention may be, for example, chilled water, ethylene glycol, or a mixture of the two when cooling the tubular cells, and heated water or the like when heating the tubular cells.

In the third example embodiment (see FIG. 8) described above, six tubular cells are arranged around each straight portion of the heat transfer pipe, but the invention is not limited to this. That is, the number of tubular cells arranged around the straight portions may be a number that is appropriate taking various factors into account, such as the diffusivity of the reaction gas and the cooling efficiency of the tubular cells.

Also, the constituent material of the seal portions provided in the module of the invention may be, for example, a thermosetting resin such as epoxy, or an adhesive that hardens by 2-liquid mixing, such as a heat-resistant epoxy based 2-liquid thermosetting adhesive or the like.

In addition, in the foregoing example embodiments, a module was described in which an air (oxygen) diffusion region is arranged in the center portion of the tubular cells and a hydrogen diffusion region is arranged at both end portions of the air diffusion region. However, the invention is not limited to this. Alternatively, the hydrogen diffusion region may be arranged in the center portion and the oxygen diffusion region may be arranged at both end portions.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. A manufacturing method of a tubular polymer electrolyte fuel cell module provided with at least one hollow MEA, and a heat transfer pipe through which flows a heating/cooling medium that selectively heats and cools the MEA, comprising:
    forming the MEA around a straight tubular member;
    forming a heat transfer pipe that includes a first straight portion, a second straight portion, and a bent portion that connects the first straight portion with the second straight portion, by bending the straight tubular member; and
    removing the MEA formed at least around the bent portion,
    wherein the heat transfer pipe includes at least one reaction gas flow path channel on an outer surface for diffusion reaction gas, the reaction gas flow path channel extending radially inward from the outer surface of the heat transfer pipe, and
    wherein the heating/cooling medium is water.

2. A tubular polymer electrolyte fuel cell module comprising:
    a tubular cell of a tubular fuel cell; and
    a heat transfer pipe through which flows a heating/cooling medium that selectively heats and cools the tubular cell, the heat transfer pipe including a first straight portion, a second straight portion, and a bent portion that connects the first straight portion with the second straight portion,
    wherein at least a portion of the tubular cell is arranged on at least one of the first straight portion and the second straight portion,
    wherein the heat transfer pipe includes at least one reaction gas flow path channel on an outer surface for diffusing reaction gas, the reaction gas flow path channel extending radially inward from the outer surface of the heat transfer pipe, and
    wherein the heating/cooling medium is water.

3. The tubular polymer electrolyte fuel cell module according to claim 2, wherein the first straight portion, the second straight portion, and the bent portion are formed by bending a single heat transfer pipe.

4. The tubular polymer electrolyte fuel cell module according to claim 2, wherein an inlet and an outlet of the heat transfer pipe are positioned on the same side with respect to the center in an axial direction of the tubular cell.

5. The tubular polymer electrolyte fuel cell module according to claim 2, wherein the tubular cell comprises a plurality of tubular cells, at least a portion of each tubular cell is arranged on one of the first straight portion and the second straight portion, and at least one of the plurality of tubular cell is arranged on each of the first straight portion and the second straight portion.

6. The tubular polymer electrolyte fuel cell module according to claim 2, wherein the first straight portion and the second straight portion are arranged on a horizontal plane, and an inlet and an outlet of the heat transfer pipe are formed facing the outside in a direction intersecting an axial direction of at least one of the first straight portion and the second straight portion when viewed from above the horizontal plane.

7. The tubular polymer electrolyte fuel cell module according to claim 2, wherein the first straight portion, the second straight portion and the bent portion are arranged in a plane and the first straight portion and the second straight portion are arranged substantially parallel to one another.

8. The tubular polymer electrolyte fuel cell module according to claim 2, wherein the first straight portion, the second straight portion and the bent portion respectively comprise a plurality of first straight portions, a plurality of second straight portions, and a plurality of bent portions, and the plurality of first straight portions, the plurality of second straight portions and the plurality of bent portions are formed in a generally cylindrical shape.

9. The tubular polymer electrolyte fuel cell module according to claim 2, wherein the first straight portion and the second straight portion respectively comprise a plurality of first straight portions and a plurality of second straight portions, the tubular fuel cell module further comprising:
    a seal portion that seals between a reaction gas and the heating/cooling medium, wherein the number of locations where the-heat transfer pipe passes through the seal portion is smaller than the sum of the number of the plurality of first straight portions and the number of the plurality of second straight portions.

10. A tubular polymer electrolyte fuel cell module comprising:

a hollow MEA; and a heat transfer pipe through which flows a heating/cooling medium that selectively heats and cools the MEA, the heat transfer pipe including a first straight portion, a second straight portion, and a bent portion that connects the first straight portion with the second straight portion, wherein the MEA is arranged on at least one of an outer peripheral surface of the first straight portion and an outer peripheral surface of the second straight portion, wherein the heat transfer pipe includes at least one reaction gas flow path channel on an outer surface for diffusing reaction gas between the outer surface of the heat transfer pipe and an inner surface of the MEA, the reaction gas flow path channel extending radially inward from the outer surface of the heat transfer pipe, and wherein the heating/cooling medium is water.

11. The tubular polymer electrolyte fuel cell module according to claim 10, wherein the heat transfer pipe serves as an internal collector, and an inner peripheral surface of the MEA contacts the at least one of the outer peripheral surface of the first straight portion and the outer peripheral surface of the second straight portion.

* * * * *